United States Patent [19]

Mine et al.

[11] Patent Number: 5,877,228
[45] Date of Patent: Mar. 2, 1999

[54] METHOD FOR CURING ULTRAVIOLET-CURABLE SILICONE COMPOSITIONS

[75] Inventors: Katsutoshi Mine; Hiroyoshi Naito; Kimio Yamakawa, all of Ichihara, Japan

[73] Assignee: Dow Corning Toray Silicone Co., LTD., Tokyo, Japan

[21] Appl. No.: 926,112

[22] Filed: Sep. 9, 1997

Related U.S. Application Data

[63] Continuation of Ser. No. 604,004, Feb. 20, 1996, abandoned.

[30] Foreign Application Priority Data

Feb. 22, 1995 [JP] Japan .................................. 07-058166

[51] Int. Cl.⁶ ........................................................ C08F 2/48
[52] U.S. Cl. .............................. 522/4; 522/99; 522/148;
522/172; 427/493; 427/515; 427/508
[58] Field of Search .............................. 522/99, 148, 172,
522/4; 359/361, 359; 250/504 R, 303.1;
313/110, 112; 427/493, 494, 508, 515

[56] References Cited

U.S. PATENT DOCUMENTS

| | | | |
|---|---|---|---|
| 4,182,665 | 1/1980 | Mibu et al. ........................ | 204/159.15 |
| 4,595,635 | 6/1986 | Dubrow et al. ........................ | 428/447 |
| 4,707,503 | 11/1987 | Itoh et al. ................. | 522/99 |
| 5,194,460 | 3/1993 | Evans et al. ............................ | 523/211 |
| 5,279,898 | 1/1994 | Evans et al. ....................... | 428/402.21 |

FOREIGN PATENT DOCUMENTS

| | | |
|---|---|---|
| 785 | of 0000 | European Pat. Off. . |
| 52371 | 11/1982 | Japan . |

OTHER PUBLICATIONS

Registry database entry for "benzil" and benzil dimethyl ketal Feb. 1998.

*Primary Examiner*—Marion E. McCamish
*Assistant Examiner*—Cheryl Juska
*Attorney, Agent, or Firm*—Sharon K. Severance

[57] ABSTRACT

Method for curing UV-curable silicone compositions, characterized by the formation of cured silicone, having a low-tack surface that is harder than the interior, by exposing an ultraviolet-curable silicone composition to ultraviolet radiation at a ratio of the exposure dose for wavelengths of 200 to 280 nm (excluding 280 nm) to the exposure dose for wavelengths of 280 to 400 nm of 0.5 to 10.0.

5 Claims, No Drawings

5,877,228

METHOD FOR CURING ULTRAVIOLET-CURABLE SILICONE COMPOSITIONS

This application is a continuation of application Ser. No. 08/604,004 filed Feb. 20, 1996 which application is now abandoned.

BACKGROUND OF THE INVENTION

1. Field of the Invention

The present invention relates to a method for curing ultraviolet-curable silicone compositions. More particularly, this invention relates to a method for curing ultraviolet curable silicone rubber compositions that yield, upon exposure to a particular type of UV radiation, cured silicone having a low-tack surface which is harder than the interior.

2. Description of the Related Art

UV-curable silicone compositions that cure rapidly into cured silicone under UV illumination are widely used in industrial applications. These UV-curable silicone compositions are exemplified by UV-curable silicone compositions in which the base ingredient is acrylamide-functional organopolysiloxane (Japanese Patent Publication Number Sho 57-52371 (1982) and European Patent Number EP 0400785) and by UV-curable silicone compositions in which the base ingredient is itself a composition comprising organopolysiloxane having at least 2 mercaptoalkyl groups in each molecule and organopolysiloxane having at least 2 alkenyl groups in each molecule (U.S. Pat. No. 4,707,503). The irradiation of these UV-curable silicone compositions with ultraviolet light is carried out using the well-known light sources, such as high-pressure mercury lamps, medium-pressure mercury lamps, low-pressure mercury lamps, hydrogen-discharge tubes, xenon-discharge tubes, metal halide lamps, and so forth.

However, the direct exposure of UV-curable silicone compositions to UV light from the aforesaid light sources yields cured silicone with a very tacky surface. This can cause handling to be quite difficult. In addition, such surfaces readily pick up dirt and dust, which causes a substantial deterioration in appearance. These problems are particularly acute with lower-hardness cured silicones. For example, when a silicone gel is formed on the surface of an optical semiconductor element using a UV-curable silicone composition, the dust and dirt picked up by the surface can cause a major decline in the performance of the element.

The inventors carried out extensive investigations in order to solve the above-described problem. As a result, it was discovered that UV light in the short wavelength region is a major contributor to curing at the surface of UV-curable silicone compositions. The inventors also found that low surface tack cured silicone whose surface is harder than its interior can be produced by exposure to UV light at a short-wavelength exposure dose/long-wavelength exposure dose ratio within a particular range. The invention was achieved based on these discoveries.

In specific terms, then, the present invention takes as its object the introduction of a method for curing an ultraviolet-curable silicone compositions that characteristically produces a cured silicone having a low-tack surface which is harder than the interior. This cured silicone is produced by exposing a UV-curable silicone composition to a particular type of UV radiation.

SUMMARY OF THE INVENTION

The method according to the present invention for curing UV-curable silicone compositions is characterized by the formation of cured silicone by exposing an ultraviolet-curable silicone composition to ultraviolet radiation at a ratio of the exposure dose for wavelengths of 200 to 280 nm (excluding 280 nm) to the exposure dose for wavelengths of 280 to 400 nm of 0.5 to 10.0.

DETAILED DESCRIPTION OF THE INVENTION

The curing method according to the present invention will be explained in detail in the following.

The nature of the UV-curable silicone composition subjected to the present invention is not crucial. UV-curable silicone compositions that may be used in the present invention include, but are not limited to, UV-curable silicone compositions in which the base ingredient is acrylamide-functional organopolysiloxane, see for example Japanese Patent Publication Number Sho 57-52371 and European Patent No. EP 0400785; UV-curable silicone compositions in which the base ingredient includes an organopolysiloxane having at least 2 mercaptoalkyl groups in each molecule and an organopolysiloxane having at least 2 alkenyl groups in each molecule, (U.S. Pat. No. 4,707,503); UV-curable silicone compositions in which the base ingredient is an alkenyl-functional organopolysiloxane; UV-curable silicone compositions in which the base ingredient is an acrylic-functional or methacrylic-functional organopolysiloxane; and UV-curable silicone compositions in which the base ingredients are an organopolysiloxane having at least 2 alkenyl groups in each molecule and an organopolysiloxane having at least 2 silicon-bonded hydrogen atoms in each molecule. Preferred for use in the present invention are UV-curable silicone compositions in which the base ingredient is an acrylamide-functional organopolysiloxane and UV-curable silicone compositions in which the base ingredients are an organopolysiloxane having at least 2 mercaptoalkyl groups in each molecule and an organopolysiloxane having at least 2 alkenyl groups in each molecule.

The nature of the aforesaid acrylamide-functional organopolysiloxane is not crucial, and it is exemplified by, but not limited to, dimethylpolysiloxane, endblocked by acrylamidopropyldimethylsiloxy at both molecular chain terminals, dimethylpolysiloxane endblocked by N-methylacrylamidopropyldimethylsiloxy at both molecular chain terminals, dimethylpolysiloxane endblocked by acrylamidoisobutyldimethylsiloxy at both molecular chain terminals, dimethylpolysiloxane endblocked by N-methylacrylamidoisobutyldimethylsiloxy at both molecular chain terminals, dimethylpolysiloxane-methylphenylsiloxane copolymer endblocked by acrylamidopropyldimethylsiloxy at both molecular chain terminals, dimethylsiloxane-methylphenylsiloxane copolymer endblocked by N-methylacrylamidopropyldimethylsiloxy at both molecular chain terminals, dimethylsiloxane-methylphenylsiloxane copolymer copolymer endblocked by acrylamidoisobutyldimethylsiloxy at both molecular chain terminals, dimethylsiloxane-methylphenylsiloxane copolymer endblocked by N-methylacrylamidoisobutyldimethylsiloxy at both molecular chain terminals, dimethylsiloxane-diphenylsiloxane copolymer endblocked by acrylamidopropyldimethylsiloxy at both molecular chain terminals, dimethylsiloxane-diphenylsiloxane copolymer endblocked by acrylamidoisobutyldimethylsiloxy at both molecular chain terminals, dimethylsiloxane-methylvinylsiloxane copolymer endblocked by acrylamidopropyldimethylsiloxy at both molecular chain terminals, dimethylsiloxane-methylvinylsiloxane copolymer endblocked by acrylamidoisobutyldimethylsiloxy at both molecular chain terminals, diphenylsiloxane-methylphenylsiloxane copolymer endblocked by acrylamidopropyldiphenylsiloxy at both molecular chain terminals, methylphenylpolysiloxane endblocked by acrylamidopropylmethylphenylsiloxy at both molecular chain terminals, diphenylpolysiloxane endblocked by acrylamidopropyldiphenylsiloxy at both molecular chain terminals, dimethylpolysiloxane endblocked by acrylamidopropyldimethylsiloxy at only one molecular chain terminal, dimethylpolysiloxane endblocked by N-methylacrylamidopropyldimethylsiloxy at only one molecular chain terminal, dimethylpolysiloxane endblocked by acrylamidoisobutyldimethylsiloxy at only one molecular chain terminal, dimethylpolysiloxane endblocked by N-methylacrylamidoisobutyldimethylsiloxy at only one molecular chain terminal, dimethylsiloxane-methylphenylsiloxane copolymer endblocked by acrylamidopropyldimethylsiloxy at only one molecular chain terminal, dimethylsiloxane-methylphenylsiloxane copolymer endblocked by acrylamidoisobutyldimethylsiloxy at only one molecular chain terminal, dimethylsiloxane-diphenylsiloxane copolymer endblocked by acrylamidopropyldimethylsiloxy at only one molecular chain terminal, dimethylsiloxane-diphenylsiloxane copolymer endblocked by acrylamidoisobutyldimethylsiloxy at only one molecular chain terminal, dimethylsiloxanemethylvinylsiloxane copolymer endblocked by acrylamidopropyldimethylsiloxy at only one molecular chain terminal, dimethylsiloxane-methylvinylsiloxane copolymer endblocked by acrylamidoisobutyldimethylsiloxy at only one molecular chain terminal, diphenylsiloxane-methylphenylsiloxane copolymer endblocked by acrylamidopropyldiphenylsiloxy at only one molecular chain terminal, methylphenylpolysiloxane endblocked by acrylamidopropyldiphenylsiloxy at only one molecular chain terminal, diphenylpolysiloxane endblocked by acrylamidopropyldiphenylsiloxy at only one molecular chain terminal, dimethylpolysiloxane bearing acrylamidopropyl in a nonterminal position, dimethylpolysiloxane bearing N-methylacrylamidopropyl in a nonterminal position, dimethylpolysiloxane bearing acrylamidoisobutyl, in a nonterminal position, dimethylpolysiloxane bearing N-methylacrylamidoisobutyl in a nonterminal position, dimethylsiloxane-methylphenylsiloxane copolymer bearing acrylamidopropyl in a nonterminal position, dimethylsiloxane-methylphenylsiloxane copolymer bearing acrylamidoisobutyl in a nonterminal position, dimethylsiloxane-methylvinylsiloxane copolymer bearing acrylamidopropyl in a nonterminal position, and dimethylsiloxane-methylvinylsiloxane copolymer bearing acrylamidoisobutyl in a nonterminal position. The aforesaid organopolysiloxanes may be used singly or as mixtures of two or more selections.

The nature of the mercaptoalkyl-functional organopolysiloxane is also not crucial, and it is exemplified by, but not limited to, dimethyl(3-mercaptopropyl)siloxy-endblocked dimethylpolysiloxane, dimethyl(3-mercaptopropyl)siloxy-endblocked dimethylsiloxanemethylphenylsiloxane copolymer, dimethyl(3-mercaptopropyl)siloxy-endblocked dimethylsiloxanediphenylsiloxane copolymer, methyl(3-mercaptopropyl)siloxane-dimethylsiloxane copolymer, methyl(3-mercaptopropyl)siloxane-methylphenylsiloxane copolymer, methyl(3-mercaptopropyl)siloxane-diphenylsiloxane copolymer, 3-mercaptopropyl(phenyl)siloxane-dimethylsiloxane copolymer, and 3-mercaptopropyl(phenyl)siloxane-diphenylsiloxane copolymer. The aforesaid organopolysiloxanes may be used singly or as mixtures of two or more selections.

The alkenyl-functional organopolysiloxane is exemplified by, but not limited to, dimethylvinylsiloxy-endblocked dimethylpolysiloxane dimethylvinylsiloxy-endblocked dimethylsiloxanemethylphenylsiloxane copolymer, dimethylvinylsiloxy-endblocked dimethylsiloxane-diphenylsiloxane copolymer, dimethylvinylsiloxy-endblocked dimethylsiloxanemethylvinylsiloxane copolymer, dimethylvinylsiloxy-endblocked dimethylsiloxanephenylvinylsiloxane copolymer, dimethylvinylsiloxy-endblocked methylvinylpolysiloxane, methylvinylsiloxane-dimethylsiloxane copolymer, methylvinylsiloxane-methylphenylsiloxane copolymer, methylvinylsiloxane-diphenylsiloxane copolymer, phenylvinylsiloxane-dimethylsiloxane copolymer, and phenylvinylsiloxane-diphenylsiloxane copolymer. The aforesaid organopolysiloxanes may be used singly or as mixtures of two or more selections.

While the amount of alkenyl-functional organopolysiloxane is not crucial, the alkenyl-functional organopolysiloxane is preferably added in a quantity that will give 0.1 to 5.0 moles alkenyl from this organopolysiloxane per 1 mole mercaptoalkyl in the mercaptoalkyl-functional organopolysiloxane.

Insofar as the object of the invention is not impaired, the UV-curable silicone compositions of the present invention may also contain a photoinitiator as an optional component. The photoinitiators that may be used in the present invention include, but are not limited to, acetophenone and its derivatives, such as dichloroacetophenone, trichloroacetophenone, tert-butyltrichloroacetophenone, 2,2-diethoxyacetophenone, and p-dimethylaminoacetophenone; benzoin and its derivatives, such as benzoin methyl ether, benzoin ethyl ether, benzoin butyl ether, and benzoin n-butyl ether; benzophenone and its derivatives, such as 2-chlorobenzophenone, p,p'-dichlorobenzophenone, and p,p'-bisdiethylaminobenzophenone; p-dimethylaminopropiophenone; Michler's ketone; benzil; benzil dimethyl ketal; tetramethylthiuram monosulfide; thioxanthone; 2-chlorothioxanthone; 2-methylthioxanthone; azoisobutyronitrile; benzoin peroxide; di-tert-butyl peroxide; 1-hydroxycyclohexyl phenyl ketone; 2-hydroxy-2-methyl-1-phenylpropan-1-one; 1-(4-isopropylphenyl)-2-hydroxy-2-methylpropan-1-one; methyl benzoylformate; diphenyl sulfide; anthracene; 1-chloroanthraquinone; diphenyl disulfide; diacetyl; hexachlorobutadiene; pentachlorobutadiene; octachlorobutadiene; and 1-chloromethylnaphthalene. Particularly preferred photoinitiators are acetophenone, benzoin, benzophenone, and their derivatives. The quantity of photoinitiator that may be used in the present invention is not critical. The preferred quanity of photoinitiator is 0.1 to 10 weight percent.

The UV-curable silicone composition may contain, for example, the following as optional components, again insofar as the object of the invention is not impaired: photosensitizers, including, but not limited to, as n-butylamine, di-n-butylamine, tri-n-butylphosphine, allylthiourea, S-benzylisothiuronium p-toluenesulfinate, triethylamine, and diethylaminoethyl methacrylate; inorganic fillers, fumed silica and quartz powder; thermally conductive fillers; including but not limited to electrically conductive fillers, metals and including but not limited to metal compounds; pigments; dyes; and organic solvents, including but not limited to hexane, heptane, toluene, and xylene.

The form of the cured silicone afforded by the curing method according to the present invention is not crucial, and the cured silicone may be, for example, a gel, rubber, or resin. Gels are preferred because they fully exploit the effects of the present invention. The viscosity of the UV-curable silicone composition used in the present invention is not crucial, but a viscosity at 25° C. from 10 to 100,000 centipoise is preferred for good handling characteristics of the composition and good physical properties in the cured silicone product.

The curing method according to the present invention requires that the UV-curable silicone composition be illuminated with ultraviolet light at a ratio of the exposure dose for wavelengths of 200 to 280 nm (excluding 280 nm) to the exposure dose for wavelengths of 280 to 400 nm (hereinafter abbreviated as the short-wavelength exposure dose/long-wavelength exposure dose ratio or SWED/LWED ratio) of 0.5 to 10.0. The surface of the cured silicone will be extremely tacky when curing is effected by direct illumination with UV light from the known sources (e.g., high-pressure mercury lamps, medium-pressure mercury lamps, low-pressure mercury lamps, hydrogen-discharge tubes, xenon-discharge tubes, metal halide lamps, etc.) with their SWED/LWED ratios below 0.5. At the other end of the range, when UV light is used at a SWED/LWED ratio in excess of 10.0, the resulting cured silicone will have a very hard surface and a large number of cracks will be produced in its surface. No particular restrictions apply to the specific technique used in the curing method according to the present invention to effect exposure to UV light at a SWED/LWED ratio of 0.5 to 10.0. For example, A UV-cut filter can be used with a conventional light source having a SWED/LWED ratio below 0.5 to adjust the SWED/LWED ratio to 0.5 to 10.0.

With regard to the use of conventional light sources in the curing method according to the present invention, UV-cut filters are available commercially for adjusting the SWED/LWED ratio of said conventional light sources to 0.5 to 10.0. Stacks of these filters may also be used. Alternatively, direct exposure to UV light from a conventional source may be carried out while at the same time effecting exposure to UV light from a conventional source that has been passed through a UV-cut filter. As another alternative, these two types of exposure can be carried out sequentially rather than simultaneously. The exposure dose at 280 to 400 nm and the exposure dose at 200 to 280 (excluding 280 nm) irradiated on the UV-curable silicone composition can be determined using an ultraviolet dose meter or similar device.

The conditions under which the UV-curable silicone composition is exposed to UV light are not critical for the curing method according to the present invention. For example, the composition can be irradiated in the air, under a vacuum, or in an inert gas (e.g., nitrogen, argon, helium, etc.) at room temperature, while cooling, or while heating to 50° C. to 150° C. Irradiation in air at room temperature is particularly preferred.

The curing method according to the present invention produces a cured silicone whose surface is harder than its interior. More particularly, the curing method according to the present invention can produce silicone gel having a tack-free silicone rubber skin at its surface. As a result of these features, this curing method is useful for the formation of protective coatings on the surface of semiconductor elements, for the formation of conformal coatings on the surface of electronic circuit substrates, for the formation of print patterns, and so forth. The curing method according to the present invention is particularly useful for the formation of a silicone gel having a tack-free silicone rubber skin that is resistant to the adhesion of dirt and dust, on the surface of a semiconductor element.

EXAMPLES

The method according to the present invention for a curing UV-curable silicone compositions will be explained in greater detail through working examples. The viscosity values reported in the examples were measured at 25° C. In order to evaluate the status of the cure at the surface and in the interior of the cured silicone, the UV-curable silicone composition was cast on an aluminum dish to a thickness of approximately 5 mm. After curing the composition by exposure to UV light, the cured silicone was removed from the aluminum dish, and the surface and interior of the cured silicone were inspected by touch.

Example 1

A UV-curable silicone composition was prepared by mixing 2 weight parts 2-hydroxy-2-methyl-1-phenylpropan-1-one to homogeneity into 100 weight parts dimethylsiloxanemethylphenylsiloxane copolymer endblocked at one molecular chain terminal with N-methylacrylamidobutyldimethylsiloxy and endblocked at the other molecular chain terminal with trimethylsiloxy. The viscosity, at 25° C., of the copolymer was 3000 centipoise. The molar ratio of dimethylsiloxane to methylphenylsiloxane in the copolymer was 10:1.

This composition was directly irradiated with UV light from a high-pressure mercury lamp while being simultaneously irradiated with UV light from a high-pressure mercury lamp that had been passed through a UV-cut filter. The product was a silicone gel having a low-tack silicone rubber skin at the surface. This silicone gel was produced using an exposure dose of 3 J/cm$^2$ for the 280 to 400 nm wavelengths and an exposure dose of 4.8 J/cm$^2$ for the 200 to 280 nm wavelengths (excluding 280 nm).

Example 2

The following were mixed to homogeneity to give a UV-curable silicone composition: 8 weight parts trimethylsiloxy-endblocked dimethylsiloxane-3-mercaptopropyl(methyl)siloxane copolymer (viscosity=100 centipoise, mercapto group content=4.0 weight %), 100 weight parts dimethylvinylsiloxy-endblocked dimethylpolysiloxane (viscosity=2,000 centipoise, vinyl content=0.23 weight %), and 1 weight part 1-(4-isopropylphenyl)-2-hydroxy-2-methylpropan-1-one.

This UV-curable silicone composition was directly irradiated with UV light from a high-pressure mercury lamp while being simultaneously irradiated with UV light from a high-pressure mercury lamp that had been passed through a UV-cut filter. The product was a silicone gel having a low-tack silicone rubber skin at the surface. This silicone gel was produced using an exposure dose of 0.5 J/cm$^2$ for the 280 to 400 nm wavelengths and an exposure dose of 0.8 J/cm$^2$ for the 200 to 280 nm wavelengths (excluding 280 nm).

Comparative Example 1

Direct exposure of the UV-curable silicone composition prepared in Example 1 with UV light from a high-pressure mercury lamp produced a silicone gel having a very tacky and soft silicone rubber skin at its surface. This silicone gel was produced using an exposure dose of 3 J/cm$^2$ for the 280 to 400 nm wavelengths and an exposure dose of 1.2 J/cm$^2$ for the 200 to 280 nm wavelengths (excluding 280 nm).

Comparative Example 2

The UV-curable silicone composition prepared in Example 1 was directly irradiated with UV light from a high-pressure mercury lamp and thereafter irradiated with UV light from a high-pressure mercury lamp that had been passed through a UV-cut filter. The product was a silicone gel having a hard silicone resin skin at the surface. This silicone gel was produced using an exposure dose of 3 J/cm$^2$ for the 280 to 400 nm wavelengths and an exposure dose of 40 J/cm$^2$ for the 200 to 280 nm wavelengths (excluding 280 nm). Numerous cracks were also observed in this silicone resin skin.

Comparative Example 3

Direct exposure of the UV-curable silicone composition prepared in Example 2 with UV light from a high-pressure mercury lamp produced a silicone gel having a very tacky and soft silicone rubber skin at its surface. This silicone gel was produced using an exposure dose of 0.5 J/cm$^2$ for the 280 to 400 nm wavelengths and an exposure dose of 0.2 J/cm$^2$ for the 200 to 280 nm wavelengths (excluding 280 nm).

EFFECTS OF THE INVENTION

The method according to the present invention for curing UV-curable silicone compositions characteristically comprises exposing a UV-curable silicone composition to ultraviolet light at a ratio of the exposure dose for wavelengths of 200 to 280 nm (excluding 280 nm) to the exposure dose for wavelengths of 280 to 400 nm of 0.5 to 10.0. As a result, this method can produce a low surface tack cured silicone whose surface is harder than its interior. More particularly, this method can produce silicone gel having a low tack silicone rubber skin at its surface.

That which is claimed:

1. A method for curing ultraviolet-curable silicone compositions, comprising the step of exposing an ultraviolet-curable silicone composition to ultraviolet radiation having an exposure dose ratio of 0.5 to 10.0, wherein the exposure dose ratio is the exposure dose for the wavelengths from 200 nm up to, but not including, 280 nm divided by the exposure dose for the wavelengths from 280 nm to 400 nm.

2. The method of claim 1, wherein the ultraviolet-curable silicone composition yields, upon cure, a silicone gel having a silicone rubber covering at its surface.

3. The method of claim 1, wherein the ultraviolet-curable silicone composition comprises an acrylamide-functional organopolysiloxane.

4. The method of claim 1, wherein the ultraviolet-curable silicone composition comprises A) an organopolysiloxane having at least 2 mercaptoalkyl groups in each molecule, and B) an organopolysiloxane having at least 2 alkenyl groups in each molecule, in a quantity that provides 0.1 to 5 moles alkenyl per 1 mole mercaptoalkyl group.

5. A method for curing an ultraviolet curable silicone composition comprising simultaneously exposing the composition to:

(A) short wavelength radiation; and
(B) long wavelength radiation;
    wherein short wavelength radiation is ultraviolet radiation having a wavelength of 200 up to, but not including, 280 nm; long wavelength radiation is ultraviolet radiation having a wavelength of 280 up to 400 nm; and the composition is exposed to the long wavelength and short wavelength radiation at an exposure dose ratio of 0.5 to 10.0, wherein the exposure dose ratio is exposure dose for short wavelength radiation divided by exposure dose for long wavelength radiation.

* * * * *